(12) United States Patent
Parosa (10) Patent No.: US 9,567,540 B2
(45) Date of Patent: Feb. 14, 2017

(54) METHOD FOR HYDROTHERMAL LIQUEFACTION OF BIOMASS AND A SYSTEM FOR HYDROTHERMAL LIQUEFACTION OF BIOMASS

(75) Inventor: Ryszard Parosa, Wroclaw (PL)

(73) Assignee: PREOIL SP. ZO.O, Lodz (PL)

( * ) Notice: Subject to any disclaimer, the term of this patent is extended or adjusted under 35 U.S.C. 154(b) by 183 days.

(21) Appl. No.: 14/414,108

(22) PCT Filed: Sep. 13, 2012

(86) PCT No.: PCT/EP2012/067887
§ 371 (c)(1),
(2), (4) Date: Jan. 11, 2015

(87) PCT Pub. No.: WO2014/008954
PCT Pub. Date: Jan. 16, 2014

(65) Prior Publication Data
US 2015/0175917 A1   Jun. 25, 2015

(30) Foreign Application Priority Data
Jul. 11, 2012  (PL) .......................................... 399911

(51) Int. Cl.
*C10L 1/02* (2006.01)
*C10L 5/40* (2006.01)
(Continued)

(52) U.S. Cl.
CPC . *C10L 1/02* (2013.01); *C10G 1/00* (2013.01); *C10G 1/008* (2013.01); *C10G 1/02* (2013.01); *C10G 3/40* (2013.01); *C10L 5/40* (2013.01); *C10G 2300/1011* (2013.01); *C10L 2290/02* (2013.01); *C10L 2290/06* (2013.01); *C10L 2290/08* (2013.01); *C10L 2290/10* (2013.01); *C10L 2290/36* (2013.01); *C10L 2290/46* (2013.01); *C10L 2290/54* (2013.01); *C10L 2290/58* (2013.01); *C10L 2290/60* (2013.01);
(Continued)

(58) Field of Classification Search
USPC ........................................... 44/307, 605, 639
See application file for complete search history.

(56) References Cited

U.S. PATENT DOCUMENTS

2004/0074760 A1* 4/2004 Portnoff ................. B01J 19/126
                                                                    204/157.15
2009/0165367 A1* 7/2009 Wang ....................... C10L 1/026
                                                                    44/308

(Continued)

*Primary Examiner* — Ellen McAvoy
*Assistant Examiner* — Chantel Graham
(74) *Attorney, Agent, or Firm* — Mark M. Friedman (57) ABSTRACT

A method for hydrothermal liquefaction of biomass, wherein the biomass supplied by pumps from a tank is provided to a reactor, in which the biomass is heated to obtain reactor products in the form of volatile, liquid and solid fractions, which are separated in a separator. The biomass supplied from the tank is pressurized in pumps, after which it is preliminarily heated in a heat exchanger. The preheated biomass is reheated in the reactor using microwave radiation. The temperature of the biomass inside the reactor is measured using temperature sensors and a controller, and based on the measurements of the temperature sensors and reflectometers, the power of radiation is adjusted to retain the biomass inside the reactor at the temperature of 374° C. to 400° C.

8 Claims, 5 Drawing Sheets (51) Int. Cl.
*C10G 1/00* (2006.01)
*C10G 3/00* (2006.01)
*C10G 1/02* (2006.01)

(52) U.S. Cl.
CPC ................ *Y02E 50/14* (2013.01); *Y02E 50/30* (2013.01); *Y02P 30/20* (2015.11)

(56) References Cited

U.S. PATENT DOCUMENTS

2009/0305355 A1* 12/2009 Henriksen ................ C10J 3/466
                                                                                                                                               435/72
2009/0314627 A1* 12/2009 O'Connor ................ C10G 1/00
                                                                                                                                               204/157.15

* cited by examiner

METHOD FOR HYDROTHERMAL LIQUEFACTION OF BIOMASS AND A SYSTEM FOR HYDROTHERMAL LIQUEFACTION OF BIOMASS

TECHNICAL FIELD

The present invention relates to a method for hydrothermal liquefaction of biomass and a system for hydrothermal liquefaction of biomass.

BACKGROUND ART

The processes of thermal biomass processing, using pyrolysis and gasification are well known. The technical inconvenience met in these processes is the large amount of water in the biomass, which necessitates evaporating the excess water. Heating of biomass is performed using conventional energy sources, such as gas or oil burners, electric heating systems, and the process of heating occurs as a result of heat conduction through the walls of a reactor.

There is known a method of hydrothermal liquefaction of biomass using indirect heating of liquefied material. This process requires high pressure in the reactor chamber and the biomass has to be heated to a high temperature. This requires application of special technical means for the process chambers. The basic technical inconvenience of the existing solutions is the difficulty of heating the biomass in its whole volume to the required temperature, as the biomass is heated only via the walls of the reactor. Excessively high temperatures of the reactor chamber walls may produce water vapour and result in local gasification and reduction of the effectiveness of the biomass liquefaction. Excessively low temperatures of biomass inside the reactor chamber, which does not adhere to the reactor's walls, may influence the reduction of liquefying efficiency and increase of volume of biocoal.

Among the existing technical solutions for the systems for hydrotechnical liquefaction of biomass there is known the HTU (Hydrothermal Upgrading) technology developed by the Stell company. In this technology, biomass undergoes liquefaction in about 5-20 minutes and about 45% of biofuel is obtained in relation to the weight of the batch material. The relatively long time of biomass liquefaction results from the technical difficulty of obtaining the required temperature in the whole volume of liquefied biomass.

Another example of known technical solutions is the NOR (New Oil Resources) technology, in which a two-stage process is performed: the first stage involves decomposition of biomass into simpler organic compounds under high temperature and pressure, whilst the second stage utilises recombination processes to generate fuel fractions.

All of the existing solutions involve supply of heat from the heated walls of the reactor to the biomass being mixed.

DISCLOSURE OF THE INVENTION

The aim of the invention is development of a new, alternative method of liquefaction of biomass in order to transform it into energy mass.

The object of the invention is a method for hydrothermal liquefaction of biomass, wherein the biomass supplied by pumps from a tank is provided to a reactor, in which the biomass is heated to obtain reactor products in the form of volatile, liquid and solid fractions, which are separated in a separator. The biomass supplied from the tank is pressurized in pumps to a pressure from 220 atm. to 250 atm., after which it is preliminarily heated in a heat exchanger to a temperature of at least 374-400° C. by the thermal energy of the reactor products and next the preheated biomass is reheated in the reactor using microwave radiation emitted by generators with a frequency from 900 MHz to 4 GHz through radiators of polarised waves, wherein the radiation directions are perpendicular with respect to the directions of the neighbouring radiators, and the width (a) of the radiator slot is smaller than half of the radiation wavelength ($\lambda$) emitted from the generators, and wherein the reflections of electromagnetic wave supplied to the radiators are measured using reflectometers placed between the radiators and the generators, and wherein the temperature of the biomass inside the reactor is measured using temperature sensors and a controller, and wherein based on the measurements of the temperature sensors and reflectometers, the power of radiation generated by the generators is adjusted to retain the biomass inside the reactor at the temperature of 374° C. to 400° C.

Another object of the invention is a system for hydrothermal liquefaction of biomass, comprising a biomass tank, connected through feed pumps with a reactor configured to heat the biomass in order to obtain reactor products in the form of volatile, liquid and solid fractions, wherein the outlet of the reactor is connected with a separator for separating reactor products. The pumps are configured to pressurize the biomass to a pressure from 220 atm. to 250 atm., and between the pumps and the reactor a heat exchanger is located, which is configured to heat the compressed biomass with thermal energy of the reactor products, and wherein the reactor is equipped with generators emitting microwave radiation at a frequency from 900 MHz to 4 GHz and connected with polarised wave radiators located along the reactor chamber, wherein the radiation directions are perpendicular with respect to the neighbouring radiators, and wherein the width (a) of the radiator slot is smaller than half of the radiation wavelength ($\lambda$) emitted from the generators, and wherein between the radiators and the generators there are positioned reflectometers for measuring the reflections of electromagnetic waves, and wherein the inner walls of the reactor are coated with a layer of a dielectric material having a value of loss angle tangent ($\tan(\delta)$) smaller than $1*10^{-2}$, and wherein the microwave radiation generators are connected to a controller configured to adjust the power of the generators on the basis of the measurements of biomass temperature sensors located on the inner wall of the reactor and the measurements of the reflectometers.

Preferably, the chambers of the heat exchanger and the reactor are combined in a common casing.

Preferably, the chambers of the heat exchanger and the reactor have separate casings.

Preferably, the radiators are located along the reactor's chamber on one side.

Preferably, the radiators are located along the reactor's chamber on opposite sides, whereby the radiators located opposite to each other have mutually perpendicular directions of polarisation.

The advantage of the present invention is that the new method of biomass liquefaction utilizes the heating of biomass inside the reactor with microwave radiation, which allows achieving the required temperature of the biomass in a very short time and heating the material equally in its whole volume. Furthermore, the application of microwave method of heating the biomass inside the reactor's chamber allows for precise control of the temperature of material inside the reactor, this way retaining the optimal physical and chemical conditions of the process, as well as acceleration of the process and thus increasing its efficiency.

BRIEF DESCRIPTION OF DRAWINGS

The present invention is shown by means of exemplary embodiments on a drawing, in which.

MODES FOR CARRYING OUT THE INVENTION

The invention concerns hydrothermal liquefaction of liquid biomass in conditions similar to critical water conditions, that is under a high temperature of approx. 374° C.-400° C. and a high pressure of 220-250 atm. In such conditions water is a very aggressive solvent which triggers depolymerisation of biomass. The products of the process of hydrothermal liquefaction of biomass under these conditions are: biooil having a high calorific value, biocoals and other organic elements dissolved in water. The condition to obtain optimal content of the liquefaction product is precise retention of the temperature of water with biomass and pressure in the reactor.

Figure 1:
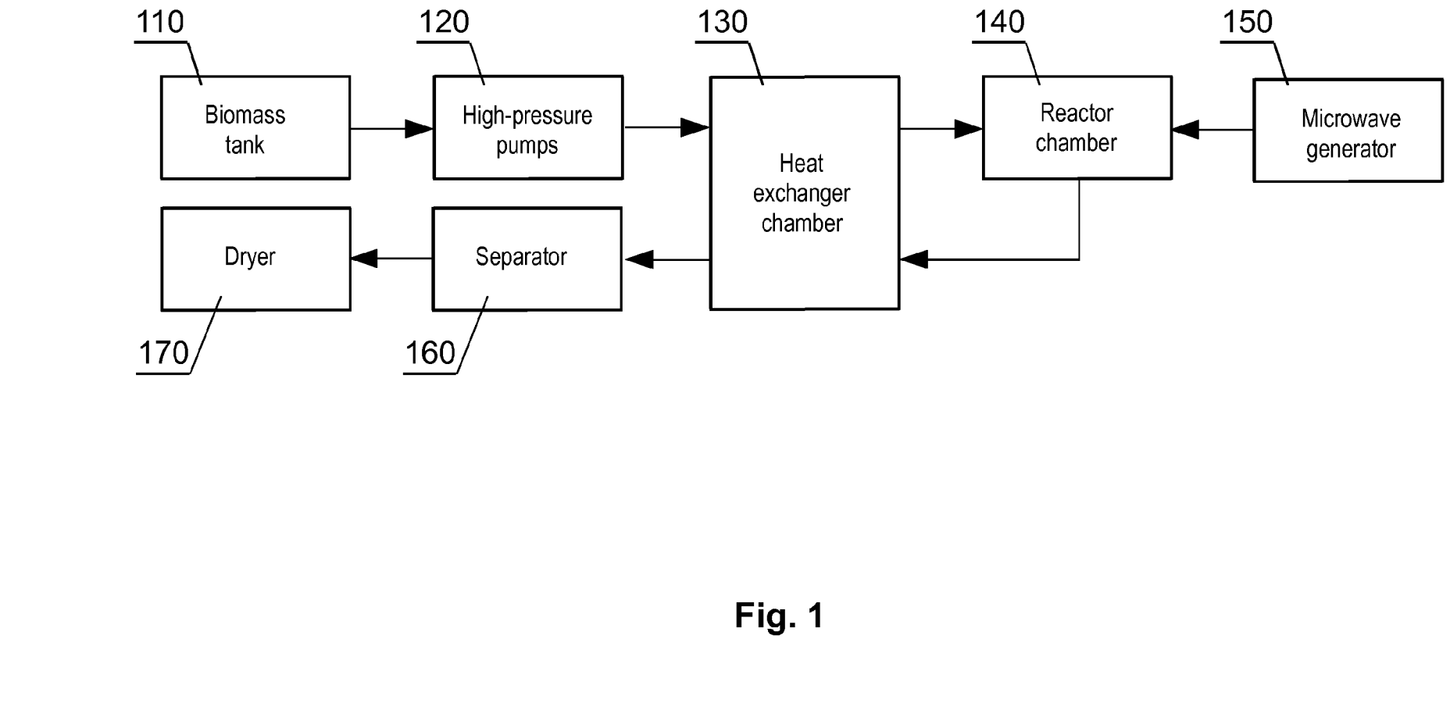
FIG. 1 presents a diagram of a technological line for hydrothermal liquefaction of biomass.
Figure 2:
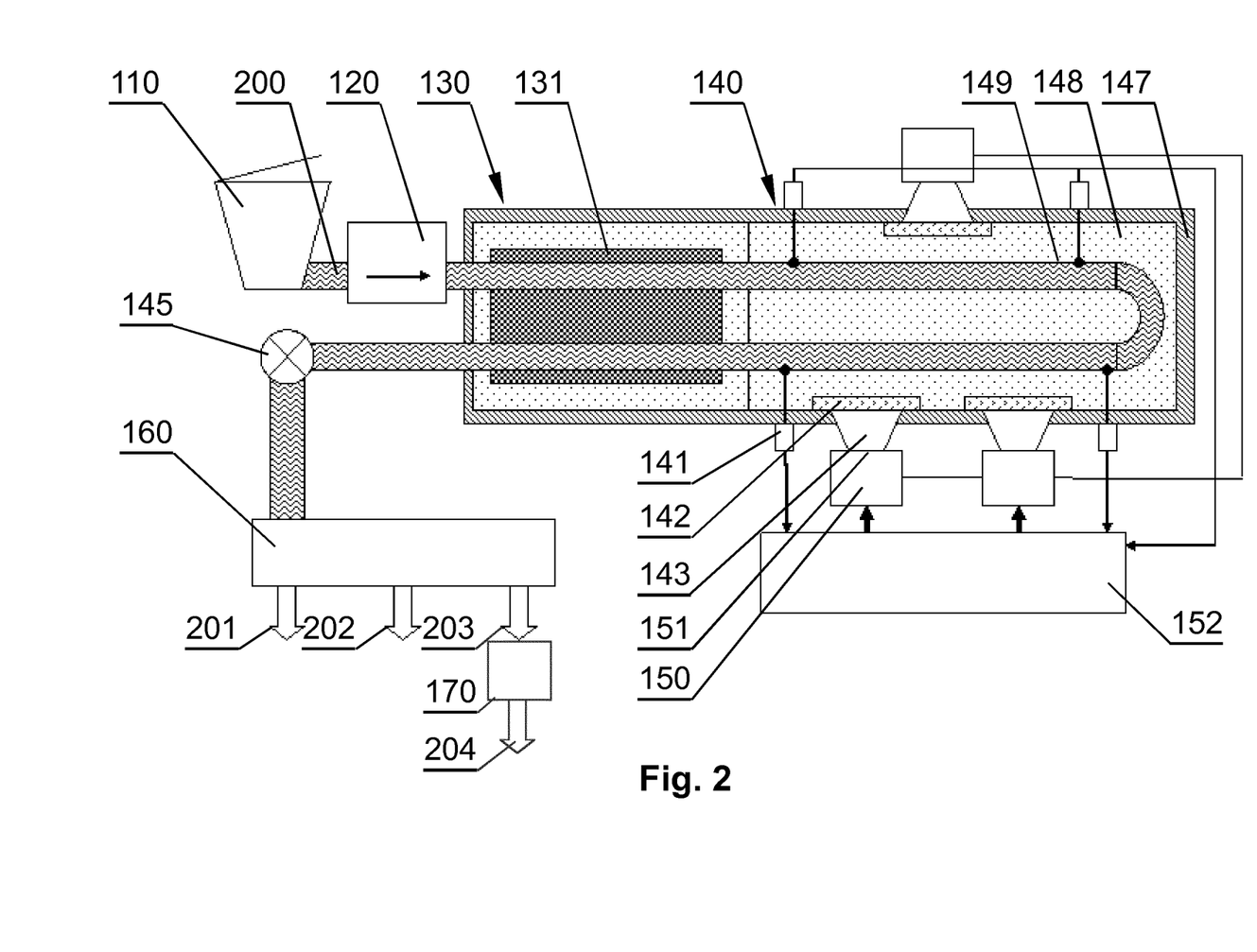
FIG. 2 presents a diagram of a system for hydrothermal liquefaction of biomass with a compact system of exchanger and reactor chambers.

FIG. 1 presents the diagram of a technological line for hydrothermal liquefaction of biomass. According to the invention, biomass 200 is collected from a tank 110 and pushed by high-pressure pumps 120 to heat exchanger chambers 130 of a reactor 140. Preferably, these chambers are combined within a common casing and constitute a compact system as presented in FIG. 2. This construction allows for heating the material supplied to the reactor chamber 140 using the heat from a mixture, which is a product of the process performed in the exchanger chamber 130. It is preferable due to the reduction of the heat loss in the sections of pipes connecting the exchanger chamber 130 with the reactor chamber 140 and allows to use thermal energy of liquefied biomass to heat the material supplied to the reactor. Moreover, this kind of compact structure is preferable due to the reduction of its construction costs and smaller size. The conduits through which the biomass 200 is pushed have a high pressure, therefore their shortening, apart from reducing heat loss, also facilitates the process of pushing, as it allows for using less efficient pumps 120. As presented in FIG. 3, the chambers 130, 140 can also be separate from each other and located in separate chambers.

After pressurizing the biomass 200 in pumps 120 to the pressure of 220 to 250 atm., the biomass 200 is heated in two stages. First, preheating of biomass 200 is performed in the heat exchanger 130 using thermal energy from a hot mixture of biooils, water vapour and other substances developed from the process of biomass 200 liquefaction in the reactor 140. In the exchanger 130 the temperature of the biomass is raised to at least 150° C.-250° C. During its pushing through heat exchangers, the heat from liquefied biomass is transferred to cold biomass pushed from the pump. In order to increase the efficiency of biomass pre-heating process, the interior of the exchanger 131 is made of metal or silicone carbide, characterised by a good thermal conductivity.

The preheated biomass 200 is pushed under high pressure to the interior of the reactor 140, where it is heated in its full volume to the required temperature, i.e. approx. 374° C.-400° C. The heating is performed using the energy of microwave radiation at a frequency 900 MHz to 4 GHz emitted from microwave generators 150. Microwave radiation energy for biomass 200 heating inside the reactor 140 is introduced to the interior of the reactor 140 through radiators 143 mounted on the metal casing of the reactor's 140 chamber. The location of the radiators is specified in details with reference to FIG. 5.

Figure 3:
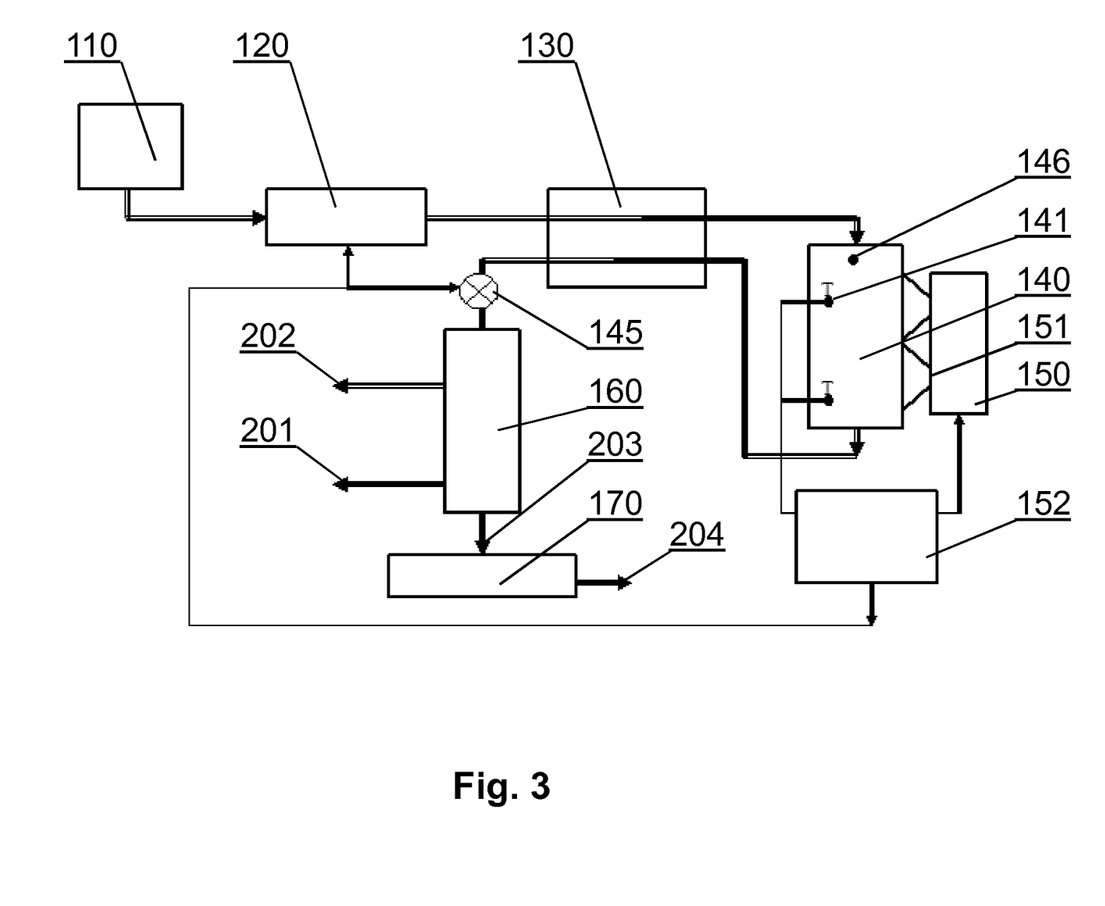
FIG. 3 presents the diagram of a system for hydrothermal liquefaction of biomass with separate exchanger and reactor chambers.
Figure 4:
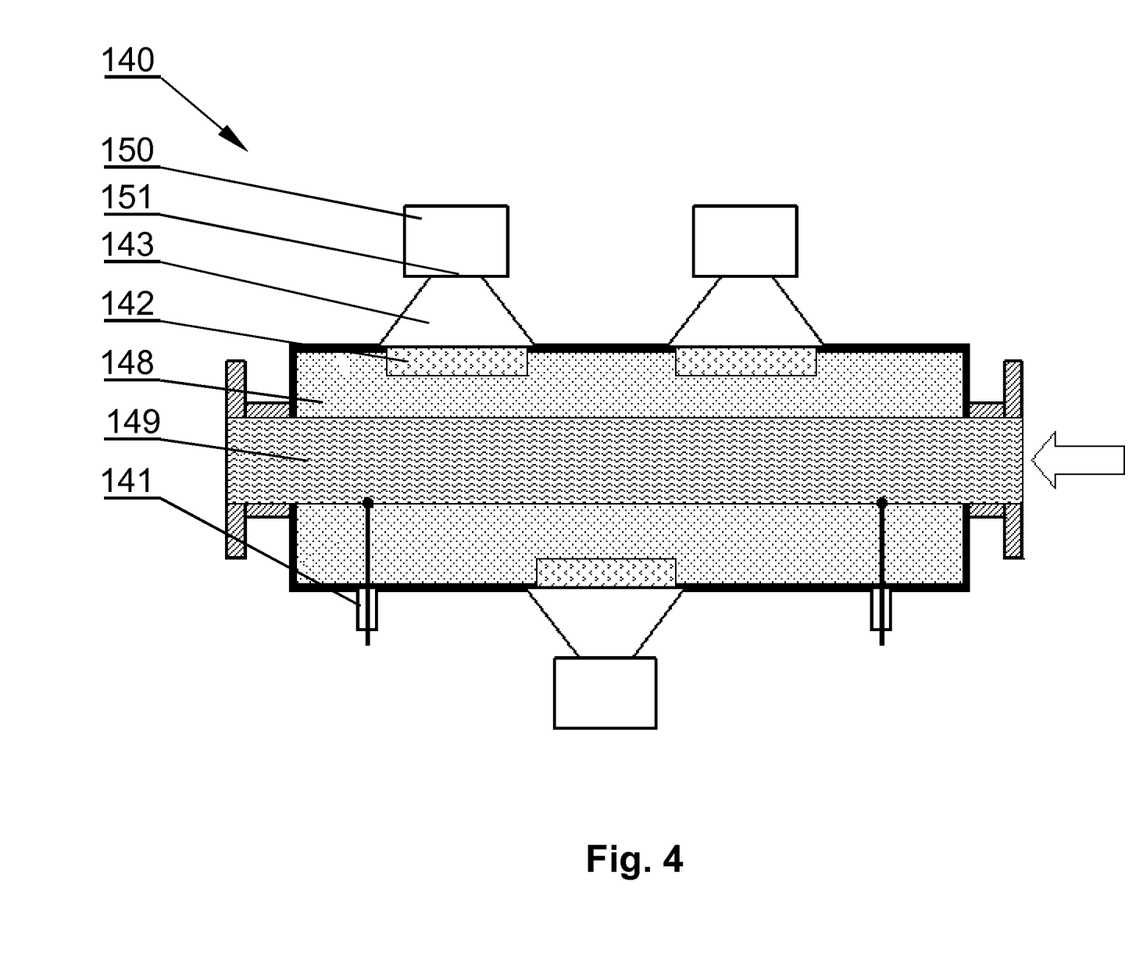
FIG. 4 presents a diagram of the reactor.
Figure 5:
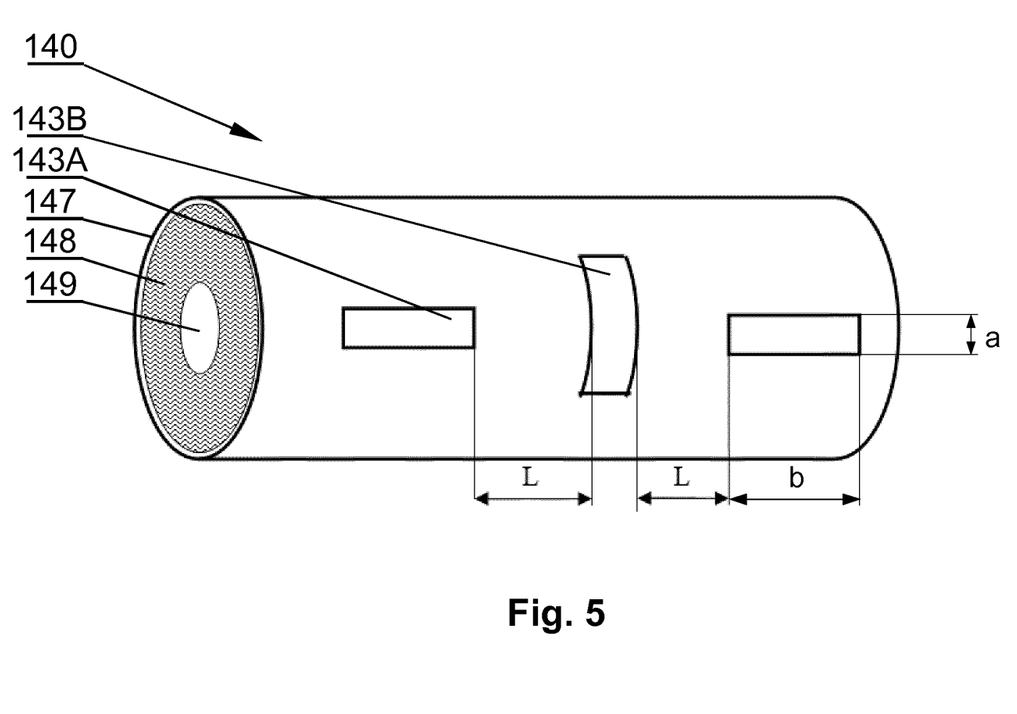
FIG. 5 presents the location of slots in the reactor casing, through which energy is supplied from microwave radiators to the interior of the chamber.

The reactor 140 presented schematically in FIGS. 4 and 5 has a form of a cylindrical metal chamber 147 with a layer 148 of ceramics or other hard dielectric material (which does not absorb the generated microwave radiation) located inside the chamber. Preferably, for the dielectric material of the layer 148 the tangent of the loss angle δ is lower than $1*10^{-2}$. The outer metal wall of the reactor 140 has slots, in which pressure-resistant screens in the form of dielectric quartz plates 142 are located; the screens do not absorb the generated microwave radiation. On the slots are microwaves radiators 143, connected with microwave generators 150. A duct 149 for pushing the biomass 200 is located in the ceramic material 148 located inside the reactor 140. A set of temperature sensors 141 (for instance, thermocouples) is located inside the reactor 140. Their purpose is precise measurement of temperature of the biomass 200 inside the reactor 140. The signal from the temperature sensors 141 is transferred to an electronic controller 152 (FIG. 3), which, based on the temperature readings (e.g. average temperature from all the sensors 141) and readings of reflectometers 151 controls the power of the microwave generators 150 so as to retain water in the critical state and retain temperature inside the reactor 140 at 374° C. to 400° C.

In the first part of the chamber, the biomass 200 is preheated with the heat of the liquefied mass pushed through the pipe from a part of the reactor 140, where the biomass 200 has been heated with microwave energy. The pre-heated biomass 200 is then pushed to a part of the chamber, where radiators 143 emitting microwaves are installed. The microwave radiators 143 are connected with microwave generators 150, whose output power is controlled by a controller 152 adjusting the power of the microwaves, depending on signals from the temperature sensors 141 and reflectometers 151.

As presented in FIG. 4, the microwave radiators 143 have a shape of horned antennas and generate polarised radiation, whilst the directions of polarisation of the neighbouring radiators through the slots 143A, 143B in metal casing, shown in FIG. 5, are mutually perpendicular. The width "a" of the radiator slot, perpendicular to the direction of the magnetic field generated by the radiator, should be lower than half of the radiation wavelength (λ) generated in vacuum (whilst the wavelength λ for the frequency from 900 MHz to 4 GHz equals 33.3 cm to 7.5 cm), so that the radiation inside the reactor 140 generated by one radiator does not affect the operation of a generator connected to a neighbouring radiator. The length "b" of the radiator slot should be from 20 cm to 33 cm. Within this scope of dimensions only two types of fields (modes) are generated. This allows for easier control of microwave transmission, as it makes matching generators with energy load much easier. Furthermore, field distribution is also more preferable—one maximum in the centre of one mode and two local maximums for the second mode. The sum of this distribution provides a mild distribution with no "hot spots". The radiators 143 can be located on one side of the reactor 140 or on its opposite sides—in this case it is important to locate the opposite radiators 143A, 143B perpendicularly to one another. Such arrangement of polarised wave radiators prevents mutual coupling of microwave generators, which means that energy from one radiator mounted on slot 143A is not bound (coupled) with the second 143B and so it is not supplied to the second generator. This would effect reduction of microwave heating process efficiency and would reduce the durability of microwave generators. Employing many generators allows to use generators with relatively low power and facilitates control of the heating process.

Reflectometers 151 are located between the microwave generator 150 and the radiator 143. In the critical state of water, the dielectric properties of water undergo a sudden change. Water has highly polar molecules and thus it quickly absorbs microwaves. Water in its critical state suddenly loses its polar properties, therefore, when reaching critical state, the absorbability of microwaves suddenly decreases. In effect, a quick increase of reflection of electromagnetic wave supplied to the radiators 143 occurs. Locating a reflectometer 151, i.e. a device for measuring the reflected wave, in a microwave line between the microwave generator 150 and the radiator 143 allows for precise measurement of the moment when water reaches its critical state. After this state has been reached, the power of microwaves is reduced in order for the power of reflected wave to remain on a stable level—slightly higher in relation to the process when critical state has not yet been reached. Thus, the signal from the microwave reflectometer 151 may be successfully used for the process optimisation, i.e. stabilisation of optimal temperature and energy saving.

Microwave heating allows to obtain the required material temperature in a very short time. The material may be heated uniformly in its whole volume. Moreover, the application of the microwave method of biomass 200 heating inside the chamber of the reactor 140 allows for highly precise control of temperature of the material inside the reactor 140, which makes it possible to retain optimal physical and chemical conditions of the process. The precision of the retention of optimal temperature is guaranteed thanks to the application of electronic temperature stabilisation system which uses automatic adjustment of microwave power. Application of microwaves for quick heating of biomass 200 in the process of hydrothermal liquefaction also allows to accelerate the process and thereby increase the efficiency of the process.

As shown in FIG. 3, the reactor 140 can have an additional pressure sensor 146. Depending on the signal from this sensor 146, the pressure valve 145 and the pump 120 are controlled. This allows to retain very high pressure of the biomass with high precision, regardless of the content and viscosity of the biomass.

In the next step the liquefied biomass is once again pushed through the heat exchanger 130 and then through a valve 145 to a separator 160, where it is separated from the remaining products, such as biogasses 201, biooils 202 and a solid fraction 203, whereas the solid fraction 203 is transported to a dryer 170 in order to obtain biocoal 204. The separator 160 can be made in form of a centrifuge or multi-stage filtering devices.

The process can be conducted as a continuous operation with automatic regulation of the speed of pushing the biomass through the reactor 140. The duration of the biomass remaining inside the reactor 140 is set by adjusting the speed of pushing of the biomass.

The invention claimed is:

1. A method for hydrothermal liquefaction of biomass, wherein the biomass supplied by pumps from a tank is provided to a reactor, in which the biomass is heated to obtain reactor products in the form of volatile, liquid and solid fractions, which are separated in a separator, wherein the biomass supplied from the tank is pressurized in pumps to a pressure from 220 atm. to 250 atm., after which it is preliminarily heated in a heat exchanger to a temperature of at least 150-250° C. by the thermal energy of the reactor products and next the preheated biomass is reheated in the reactor using microwave radiation emitted by generators with a frequency from 900 MHz to 4 GHz through radiators of polarised waves, wherein the radiation directions are perpendicular with respect to the directions of the neighboring radiators, and the width (a) of the radiator slot is smaller than half of the radiation wavelength ($\lambda$), when measured for vacuum conditions, emitted from the generators, and wherein the reflections of electromagnetic wave supplied to the radiators are measured using reflectometers placed between the radiators and the generators, and wherein the temperature of the biomass inside the reactor is measured using temperature sensors and a controller, and wherein based on the measurements of the temperature sensors and reflectometers, the power of radiation generated by the generators is adjusted to retain the biomass inside the reactor at the temperature of 374° C. to 400° C.

2. A system for hydrothermal liquefaction of biomass, comprising a biomass tank, connected through feed pumps with a reactor configured to heat the biomass in order to obtain reactor products in the form of volatile, liquid and solid fractions, wherein the outlet of the reactor is connected with a separator for separating reactor products, wherein the pumps are configured to pressurize the biomass (200) to a pressure from 220 atm. to 250 atm., and between the pumps and the reactor a heat exchanger is located, which is configured to heat the compressed biomass with thermal energy of the reactor products, and wherein the reactor is equipped with generators emitting microwave radiation at a frequency from 900 MHz to 4 GHz and connected with polarised wave radiators located along the reactor chamber, wherein the radiation directions are perpendicular with respect to the neighboring radiators, and wherein the width (a) of the radiator slot is smaller than half of the radiation wavelength ($\lambda$), when measured for vacuum conditions, emitted from the generators, and wherein between the radiators and the generators there are positioned reflectometers for measuring the reflections of electromagnetic waves, and wherein the inner walls of the reactor are coated with a layer of a dielectric material having a value of loss angle tangent (tan($\delta$)) smaller than $1*10^{-2}$, and wherein the microwave radiation generators are connected to a controller configured to adjust the power of the generators on the basis of the measurements of biomass temperature sensors located on the inner wall of the reactor and the measurements of the reflectometers.

3. The system according to claim 2, wherein the chambers of the heat exchanger and the reactor are combined in a common casing.

4. The system according to claim 2, wherein the chambers of the heat exchanger and the reactor have separate casings.

5. The system according to claim 2, wherein the radiators are located along the reactor chamber on one side.

6. The system according to claim 2, wherein the radiators are located along the reactor chamber on opposite sides, whereby the radiators located opposite to each other have mutually perpendicular directions of polarisation.

7. A method for hydrothermally liquefying a biomass, the method comprising:
- supplying the biomass by pumps from a tank to a reactor;
- in the pumps, pressurizing the biomass to a pressure from 220 atm. to 250 atm.;
- in a heat exchanger, preliminary heating the pressurized biomass to a temperature of at least 150-250° C.;
- in the reactor, heating the biomass to obtain reactor products in form of volatile, liquid and solid fractions, using microwave radiation emitted by generators and having a frequency from 900 MHz to 4 GHz through radiators of polarised waves;
- wherein directions of radiation of the generators are perpendicular with respect to the directions of their neighboring radiators, and wherein the width (a) of a radiator slot is smaller than half of radiation wavelength ($\lambda$), when measured for vacuum conditions, emitted from the generators;
- measuring reflections of electromagnetic wave supplied to the radiators by reflectometers placed between the radiators and the generators;
- measuring temperature of the biomass inside the reactor using temperature sensors and a controller;
- based on the measurements of the temperature sensors and reflectometers, adjusting the power of radiation generated by the generators to retain the biomass inside the reactor at the temperature of 374° C. to 400° C.;
- separating the reactor products in a separator;
- using the thermal energy of the reactor products to heat the pressurized biomass in the heat exchanger.

8. A system for hydrothermal liquefaction of a biomass, the system comprising:
- a biomass tank connected through feed pumps to a reactor configured to heat the biomass in order to obtain reactor products in the form of volatile, liquid and solid fractions, the outlet of the reactor being connected with a separator for separating reactor products;
- wherein the pumps are configured to pressurize the biomass to a pressure from 220 atm. to 250 atm.;
- and further comprising a heat exchanger between the pumps and the reactor, the heat exchanger being configured to heat the compressed biomass with the thermal energy of the reactor products;
- wherein the reactor comprises generators for emitting microwave radiation at a frequency from 900 MHz to 4 GHz and connected with polarised wave radiators located along the reactor chamber;
- wherein the radiation directions are perpendicular with respect to the neighboring radiators, and wherein the width (a) of a radiator slot is smaller than half of the radiation wavelength ($\lambda$), when measured for vacuum conditions, emitted from the generators;
- and further comprising reflectometers positioned between the radiators and the generators, for measuring the reflections of electromagnetic waves;
- wherein the inner walls of the reactor are coated with a layer of a dielectric material having a value of loss angle tangent ($\tan(\delta)$) smaller than $1*10^{-2}$;
- wherein the microwave radiation generators are connected to a controller configured to adjust the power of the generators on the basis of the measurements of biomass temperature sensors located on the inner wall of the reactor and the measurements of the reflectometers.

* * * * *